United States Patent [15] 3,644,888

Marino [45] Feb. 22, 1972

[54] ERROR-DETECTING APPARATUS FOR A KEYSTROKE-OPERATED BUSINESS MACHINE

[72] Inventor: Francis C. Marino, Huntington, N.Y.

[73] Assignee: Digitronics Corporation, Albertson, N.Y.

[22] Filed: Apr. 13, 1970

[21] Appl. No.: 27,689

[52] U.S. Cl. ..........................340/146.1, 178/17 R, 340/345

[51] Int. Cl. ........................................G08c 25/00, G06f 11/00

[58] Field of Search .......................340/146.1, 345; 235/153; 178/17 R, 17 A, 17 C, 79

[56] References Cited

UNITED STATES PATENTS

| | | | |
|---|---|---|---|
| 3,308,918 | 3/1967 | James | 178/17 X |
| 3,110,884 | 11/1963 | Scharff | 340/146.1 |
| 3,457,368 | 7/1969 | Houcke | 178/17.5 X |

*Primary Examiner*—Charles E. Atkinson
*Attorney*—Yuter & Fields

[57] ABSTRACT

An apparatus which detects errors between the entry of data in a business machine of the type having a plurality of selectively and individually operable information keys movable between a rest and a first commitment level to enter information into the machine and a record of such information. Sensing means senses for discrepancies between machine-entered information and the record and an error-indicating means is energized when a discrepancy is sensed to indicate such error.

19 Claims, 15 Drawing Figures

INVENTOR.
FRANCIS C. MARINO
BY Yuter & Fields
Attorneys

ERROR-DETECTING APPARATUS FOR A KEYSTROKE-OPERATED BUSINESS MACHINE

The present invention relates generally to error-detecting apparatus and, more particularly, pertains to apparatus for detecting discrepancies between machine entries and a record of such entries in a business machine.

Direct data communication between machines such as a computer and the like is becoming more widespread as methods and facilities for accomplishing substantially error-free transmission of data expands. For example, telephone companies presently provide facilities for the transmission of data between machines over existing telephone lines. This service has been found to be particularly useful to those companies having, for example, a central office and a number of subsidiary or branch offices separated by relatively large distances. To be more specific, a computer may be located at the main or central office. Data, such as accounting data or the like, is transmitted to the central computer from the branch or subsidiary office. This procedure results in a tremendous economic saving in that the cost of equipment of only one centrally located computer is required rather than a plurality of computers, each one of which is located in a different branch office.

Presently, in order to take advantage of the communication system described above, conventional business machines such as adding machines, comptometers and the like are being provided with recording systems for simultaneously converting and recording the information entered in such business machines into data signals which may be transmitted to a central receiver for application to a computer. Thus, complete bookkeeping records of a branch office may be fed directly into a centrally located computer so that the complete accounting picture of an entire organization may be had in a minimum of time.

Another common application for such devices is in the field of inventory control. For example, in many large retail organizations with a great number of widely separated retail outlets, central warehousing has become the norm. Generally, the local retail outlet periodically examines their inventory and orders stock from the central warehouse to replenish the missing items. A more specific example of one typical retail organization operating in the above manner is the supermarket trade. In operation, a clerk wheels a business machine through the aisles and enters and records notations indicating stock that needs to be replenished. The mechanical entries are usually printed out on a paper tape so that the clerk has a "hard copy" of the information he has entered and he can visually check the same for errors. However, the clerk has no means for checking the corresponding recording of the entered information, which may be on a magnetic tape or a punched tape or card and the like.

It will become obvious from a consideration of the above, that there must be a direct identity between each, the information entered into the machine and the corresponding information recorded in the recording device. To put this another way, if the character entered into the business machine represents the digit "3" and a corresponding character entered into the recording device represents a digit other than "3", a gross error will be introduced into the system. Hence, it is of primary importance to assure a perfect one-to-one correspondence between the machine and the recording device entries.

Errors of the type referred to may arise in any one of a number of different manners. For example, an incomplete key stroke on the part of an operator or a stroke called a dithering key stroke (i.e., a key stroke which includes some slight backward or irregular motion) are two of the numerous types of operator errors which may cause discrepancies between entries and recordings thereof. More specifically, an incomplete key stroke may permit the recording device to record the character; however, the stroke may be insufficient to permit the business machine to mechanically enter the character. Hence, a discrepancy will exist between the machine entry and the recorded entry. An irregular or dithering key stroke motion may cause a recording system to record a plurality of character entries, while the business machine only registers a single entry.

Another type of entry error that may arise is caused by overspeeding or slurring. That is, the operator depresses or otherwise operates two keys in quick succession. The machine needs a certain fixed time to make a mechanical entry corresponding to each key stroke because of the inertia of the mechanical parts. If the key strokes quickly follow each other, the machine may not have time to make the proper mechanical entry for both key strokes. This action may prevent the mechanical entry of one or both of the key strokes.

A further error associated with systems of the type described arise when more than one key is operated at substantially the same time. Thus, most business machines are provided with a mechanical interlock which is operable to prevent more than one key from actuating the mechanism during a key stroke. If two or more keys are operated simultaneously, the interlock may prevent any one key from being fully operated. However, the presence of this mechanical interlock does not prevent the indexing of the internal mechanical memory element of a pin box-type business machine if the keys are struck simultaneously with sufficient force. If this type of improper key stroke is undetected, a discrepancy will occur between the electrically recorded data and the mechanically entered data.

Another common occurrence which may cause an error is due to what is termed transmission failure rather than an operator error and can arise from a number of causes. For example, dirty electrical contacts may cause a faulty electrical transmission. Since these contacts have no effect upon the mechanical entry, a discrepancy will occur. Another cause of transmission failure may be a strong electrical or mechanical disturbance. In any event these transmission failures result in faulty electrical recordings.

If any of the above causes do introduce an error, it is important to notify the operator. Such notification should be positively brought to the operator's attention and ensure that the operator takes corrective measures before continuing to enter data into the machine. Further, since the error most likely has resulted in a discrepancy between the mechanically entered data and that electrically recorded, the electrically recorded data must be brought into conformity with the corrected mechanically entered data.

Accordingly, an object of the present invention is to provide an improved error-detecting apparatus for business machines which is operable to detect discrepancies between machine entries and the record representing such entries.

A more specific object of the invention is to provide an error-detecting apparatus for business machines for indicating recording errors to the machine operator.

Another object of the invention is to provide an apparatus which prevents further entry of data into the business machine until the detected error has been corrected.

Another object of the invention is to provide an error-detecting apparatus of the type described which is inexpensive to fabricate and efficient in operation.

Accordingly, an error-detecting apparatus constructed according to the present invention is adapted to detect errors between the entries representing information in a business machine of the type having a plurality of selectively and individually operable information keys movable between a rest and a first commitment level to enter information into the machine and the record of such information which comprises entry means responsive to the operation of the plurality of information keys from said rest to said first commitment level for entering information into the machine represented by the operated information keys. Recording means is responsive to the movement of said plurality of information keys from the rest to at least said first commitment level for converting the information represented by the operated information keys into recordable signals and for recording such signals on the record medium. Sensing means is provided for sensing if a discrepancy exists between the information entered into the machine and the record representing such information. An error-indicating means which is responsive to the operation of the sensing means when such discrepancy is sensed is provided for indicating such error.

Other objects and advantages of the present invention will become more apparent from a consideration of the following detailed description when taken in conjunction with the accompanying drawings, in which.

The error-detecting apparatus of the present invention is ideally suited for use in conjunction with any type of conventional key stroke-operated business machine which mechanically registers information and is operable to record such information and to detect errors due to discrepancies between registered and recorded information. For purposes of illustration, the device of the present invention will be described in conjunction with the operation of an adding machine and, in particular, the Odhner Electric Adding Machine Model E11C-2, which is manufactured by the Aktiebolaget Original-Odhner, Gothenburg, Sweden. The construction of this machine is representative of the construction of many commercially available key stroke-operated machines. Only those portions of a machine which are pertinent to a clear understanding of the recording system of the present invention will be disclosed since the machine per se is well known. Further information on the machine may be obtained from publications of the Odhner Corporation, such as their service manual or their catalog of spare parts. In addition, U.S. Pat. No. 3,472,448, entitled "Recording System for Business Machines," inventors E. Wolf et al.; U.S. Pat. No. 3,472,449, entitled "Recording System for Business Machine," inventors F. C. Marino et al.; U.S. Pat. Application Ser. No. 698,302, filed Jan. 16, 1968 and now U.S. Pat. No. 3,562,765, issued Feb. 9, 1971, entitled "Recording System for Business Machines," inventor F. C. Marino; and U.S. Pat. Application Ser. No. 19,034, filed Mar. 12, 1970, entitled Actuating Apparatus for a Business Machine, inventor Marvin Shapiro, all of which are assigned to the assignee of the present application, should also be consulted for further information and disclosure concerning the construction of key stroke-operated business machines and the prevention of such errors.

It is emphasized that the adding machine referred to herein is for illustrative purposes only and is not to be interpreted as being a limitation of the present invention. That is, the error-detecting apparatus of the present invention can be utilized with any type of key stroke business machine.

In the interest of clarity, the operation of the character entry portion of the adding machine will be presented first. This will be followed by a brief description of some of the more common errors inherent in a key stroke business machine, either through operator error or equipment failure. A detailed description of the present invention will then follow. Finally, a brief example of the operation of the present invention is given.

Figures 1, 2, 3, 4, 5, 6:
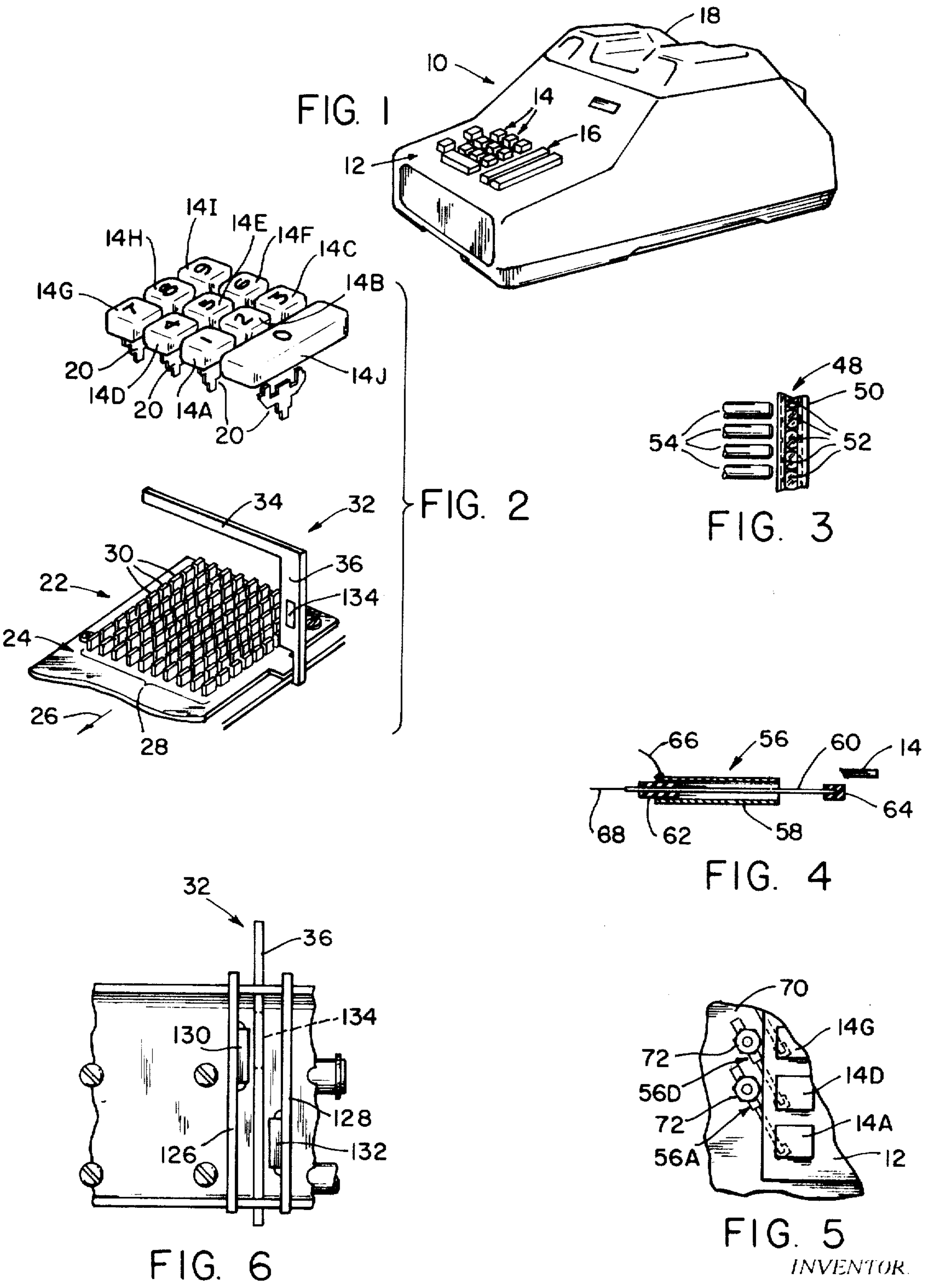
FIG. 1 is a perspective view of the business machine adapted to utilize an apparatus constructed according to the present invention.
FIG. 2 is an exploded perspective view of the elements comprising the memory portion and character key portion of the machine shown in FIG. 1.
FIG. 3 is a top plan view of a portion of the character key-mechanical interlock means.
FIG. 4 is a vertical sectional view of a character key-operated coaxial switch forming a portion of the present invention.
FIG. 5 is a fragmentary top plan view of the keyboard of the machine shown in FIG. 1, illustrating the relationship between the character keys and the character key-operated coaxial switches.
FIG. 6 is a front elevational view of the magnetic reed switch assembly of the present invention.

FIG. 1 illustrates a key stroke-operated adding machine of the type adapted to utilize the apparatus of an embodiment of the invention. The adding machine is generally designated by the reference numeral 10. The adding machine 10 includes a keyboard 12 having a plurality of information keys which comprise character keys designated generally by the reference numeral 14 and function keys designated generally by the numeral 16. As is conventional with machines of this type, there are 10 character keys 14A through 14J (FIG. 2) which respectively represent the digits "1–0." The character keys 14 may be individually and selectively operated to cause the corresponding selected digits to be entered into the machine. On the other hand, function keys 16 may be individually and selectively operated to cause the machine to perform specific functions such as add, subtract, subtotal, total, etc. Defined in the top surface of the machine 10 is an opening 18. Through opening 18 a paper tape record (not shown) displaying the various entries introduced into the machine may pass. Accordingly, the operator of the machine has an instantaneous visual record or hard copy of the character entered into the machine and the totals, subtotals, etc., of the characters, as the case may be. Since the operation of the paper tape record portion of the machine 10 is not pertinent to an understanding of the present invention, it will not be discussed in detail herein.

As shown more particularly in FIG. 2, the character keys 14A through 14J include finger pieces, each one of which has a different digit etched in the upper surface thereof, corresponding to the digit represented by that individual key. For example, the finger piece of the key 14A bears the numeral or digit "1." Accordingly, the depression or operation of that particular character key will cause the digit or numeral "1" to be entered into the machine 10.

Depending from each one of the character keys 14, is a leg member 20. Leg member 20 is connected by an appropriate linkage mechanism (not shown) to a memory or registery device generally indicated by reference numeral 22 (FIG. 2). Memory device 22 is described in detail in the first two of the above-referenced patents. Since the memory device 22 does not generally concern the present invention, only a brief description of it is given.

Memory device 22 includes a carriage 24 which is movable in a direction indicated by arrowhead 26. The carriage 24 supports a plurality of longitudinally spaced columns 28 of 10 transversely spaced memory or register pins 30. Pins 30 are adapted to be moved from a rest position to an operative position to register the entry of a character into the machine. The columns 28 correspond in number to the number of columns of digits which may be entered into machine 10. The 10 transversely spaced pins 30 correspond to nine of the character keys contained on the keyboard and an index pin (one of the characters on the keyboard 12 is indicated by the absence of any operated pin within the column).

A linkage mechanism (not shown) connects the character keys 14 with the memory device 22 and normally overlies the first column 28 (the left-hand column as taken in FIG. 2). As the character key is operated, the corresponding memory pin 30 is depressed. At the bottom of the character key stroke, the memory pin 30 is fully depressed. A this point, carriage 24 indexes to an intermediate position. This is referred to as the forward mechanical commitment point or level of the machine. When the operator removes the pressure from the operated key 14, that key 14 returns to its normal or rest position under the action of an appropriate biasing device (not shown). At a point near the upwardmost travel of the operated character key 14, carriage 24 indexes to its next rest position, (i.e., the next column 28 of pins 30 underlies the linkage mechanism). The point at which this indexing occurs is referred to as the reverse mechanical commitment point or level of the machine. Further details of the indexing and stepping mechanism of carriage 24 are given in the above-referenced patent applications.

The character keys 14A–14J are adapted to operate a pin box step bow 32 (which effects the above-mentioned indexing) when any of the keys 14 is operated. Bow 32 includes a laterally projecting arm 34 and a downwardly extending leg 36 which is positioned at the front of the carriage 24. An appropriate linkage mechanism (not shown) is provided to connect character keys 14 with the arm 34 so that the operation of any one of the character keys 14 will cause bow 32 to move downwardly. Bow 32 carries magnet 134. The function of magnet 134 is described below in conjunction with FIG. 6.

Referring to FIG. 3, the mechanical interlock means is illustrated. The interlock means is generally designated by the reference numeral 48. It comprises a track 50 containing a plurality of spacing elements 52. A plurality of fingers 54 are individually aligned with the space between adjacent spacing elements 52. The fingers 54 are normally in spaced relationship to the spacing elements 52.

Each one of the fingers 54 is connected to a different one of the character keys 14 by an appropriate link (not shown). When a character key 14 is depressed, the finger 54 connected thereto will move forward relative to the spacing elements 52 and extend between two adjacent spacing elements. The track 50 and the spacing elements 52 are sized so that the distance between all the spacing elements and the ends of the track are substantially equal to the widths of a single finger 54. Accordingly, when one finger 54 is received between a pair of spacing elements 52, the spacing elements 52 will be forced against each other. The end spacing elements 52 will be forced against the ends of the track. Since each spacing element 52 is in engagement with the next adjacent spacing element, the possibility of any one of the other fingers 54 moving therebetween, as when a person attempts to depress a second character key, will be eliminated. Hence, the interlock means 48, in effect, prevents the complete depression of more than one of the character keys 14 at any one time. Moreover, because the memory device 22 is advanced one column each time a character key 14 is depressed, it will be obvious that the interlock means 48 is operable to prevent the entry of more than one digit in a column 28.

Associated with each of the character keys 14 is a recording network 171 (see FIG. 10) to indicate to the recorder which character key 14 has been operated. Recording network 171 includes a plurality of data switches.

Referring to FIGS. 4 and 5 the form of data switches can be seen as coaxial switch 56. A different coaxial switch 56 is located below each of keys 14A–14J (see FIG. 5).

Referring first to FIG. 4, the construction of coaxial switches 56 is seen. A coaxial switch 56 comprises a conducting outer sleeve 58 and a flexible and resilient coaxial inner conductor 60 which is maintained in spaced relationship to the sleeve 58 by an insulating member 62 connected to the rear end of the conductor 60. The conductor 60 projects beyond the front end of the sleeve 58 and receives an insulating member 64 on its end. The end of the conductor 60 carrying the insulating member 64 is positioned below the finger piece of the key 14 so that when the key 14 is depressed, the finger piece engages and flexes the inner conductor 60. Conductor 60 contacts the outer sleeve 58 to close switch 56. The outer sleeve 58 is connected to lead 66 and the inner conductor 60 is connected to lead 68.

In FIG. 5, the placement of coaxial switches 56 is shown. A support plate 70 is located below keyboard 12. By way of example, a small section of keyboard 12 has been shown. On this portion are mounted keys 14A, 14D, and 14G. Mounted by a bolt 72 on support plate 70 below each key 14 is a coaxial switch 56. That is, below key 14A is mounted coaxial switch 56A, below key 14D is mounted coaxial switch 56D, etc. Inner conductors 60 are positioned below their respective keys 14, as set forth in the preceding paragraph.

Although coaxial switches have been used for data switches, this was by way of explanation, not limitation. For example, for each of the coaxial switches a magnetic reed switch arrangement could be substituted. Also, these switch arrangements can be used interchangeably.

Figure 7:
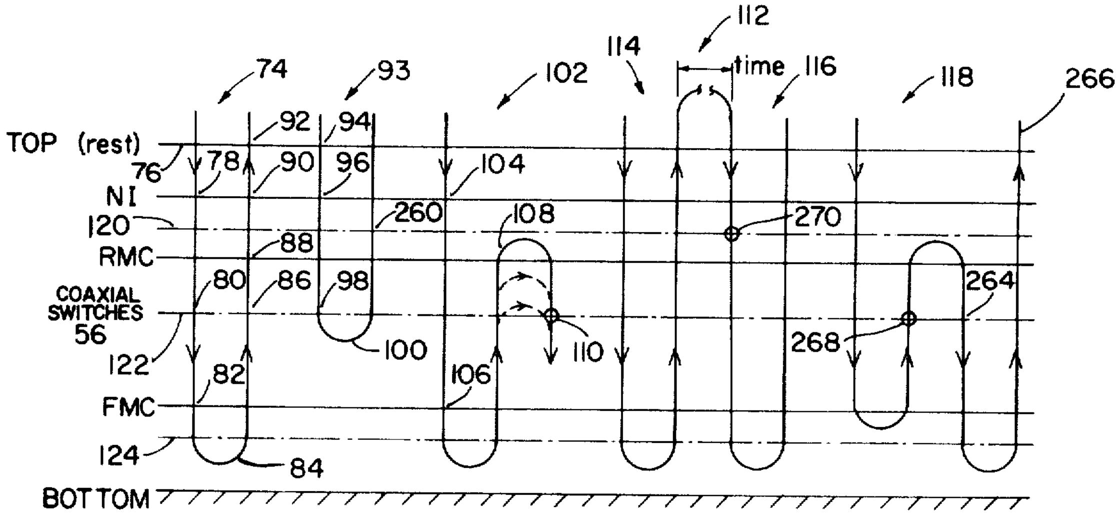
FIG. 7 is a diagrammatic representation of key travel showing a few of the more common errors due to variations in such key travel which may arise in the machine shown in FIG. 1.

FIG. 7 illustrates a diagrammatical representation of the points of operation of the machine and the apparatus of the present invention as a function of key travel and some of the more common key stroke errors which may arise in the general key stroke-operated business machine. Graph 74 of FIG. 7 depicts a proper key stroke. The character key 14 is normally at the top or rest position 76. When the operator depresses the key to commence the key stroke, the key 14 passes through the key mechanical interlock level (NI) at point 78. It is at this point that the finger 54 associated with the particular operated key 14 engages spacing elements 52. In conformity with the above description, this prevents other keys 14 from being operated past this numeric key mechanical interlock level.

Continued depression causes the key 14 to continue to travel downwardly. At point 80, key 14 causes the associated coaxial switch 56 to close. At a further point in its downward travel, specifically, point 82, key 14 passes the forward mechanical commitment level (FMC) of the machine 10. This was described above as the point where carriage 24 steps to an intermediate position. Finally, the key 14 reaches the bottom point 84 of its travel.

When the operated key is released, the key 14 begins its return stroke under the influence of the biasing device. At point 86, the associated coaxial switch 56 opens. Next, the key 14 allows the carriage to step to its next rest position as the key 14 passes the reverse mechanical commitment level (RMC) at point 88. Finally, at point 90 the finger 54 disengages from spacing elements 52 and, at point 92 the key assumes its rest position again. Thus, a proper key stroke must close the associated coaxial switch 56, pass the forward mechanical commitment (FMC), and pass the reverse mechanical commitment level (RMC) and in this order. If any variation occurs, an error most likely results.

Four such errors are illustrated in FIG. 7. The first error is caused by a partial forward key stroke. That is, if an operator does not depress the key to the forward mechanical commitment level, an error will often occur between the recorded information and that mechanically entered into the machine 10. This is illustrated by the second graph 93, in FIG. 7.

As the operator depresses the key 14 from its rest position 94 it passes through the numeric key mechanical interlock level 96 and closes coaxial switch 56 at point 98. However, the key 14 is not depressed far enough to reach the forward mechanical commitment level FMC, but rather starts its up stroke at point 100. If closure of the switch 56 were to initiate recording, the information represented by the operated key 14 would be recorded on the record medium. However, since the forward commitment level FMC was not reached, the carriage 24 never stepped to its intermediate position. As a result, when the operator presses the next character key 14 to enter the next digit in the number, that digit will be entered in the same column position as the previous digit. Thus, two pins will be depressed in the same column 28. Another possible alternative is that if the first key was not depressed to a sufficient depth the first digit would not be mechanically entered but would be recorded on the record medium due to closure of the switch 56. Either of these two operations results in a discrepancy between the mechanical entry and the record representing such entry.

The third graph of FIG. 7, designated generally by the reference numeral 102, shows a reverse partial key stroke. The down stroke 104 is perfectly proper and passes the forward mechanical commitment level FMC at 106. However, after passing the reverse mechanical commitment level RMC at point 108, the operator has inadvertently increased the pressure, thereby again depressing the key past the point 110 where coaxial switch 56 recloses. Thus, coaxial switch 56 has been closed twice during key stroke 102 and could result in a recording of the same digit twice but only one entry in the machine.

Graph 112 illustrates another key stroke error, that may be caused by the operator depressing the keys too rapidly in succession. That is, graph 112 is composed of two key depressions 114 and 116. In the business machine 10 of the pin box variety, the carriage 24 takes a finite time to step from one rest position to another. If the keys 14 are stroked too rapidly in succession, the carriage 24 does not have enough time to move to the next position. Thus, an error will occur by the operator failing to make a mechanical entry on the second stroke, but possibly making an electrical entry. This discrepancy must be brought to the operator's attention as an error. It is seen from FIG. 7 that key stroke 116 follows key stroke 114 within *t* milliseconds.

In practice, it has been found that the carriage 24 and the associated mechanical elements require about 25 msec. to advance the carriage to the next succeeding column position. Hence, if *t* is less that 25 msec. an error may arise whereas if *t* is greater than 25 msec. this type of error will be eliminated.

The last graph 118 shows an error combination to be discussed in greater detail below. The preferred embodiment of the invention, which detects the error combination of graph 118 not only detects that error combination, but also faulty electrical contacts.

Another common error results when the operator strikes two keys 14 simultaneously. Because two keys cannot pass the numeric key mechanical interlock level NI simultaneously, neither mechanical entry nor recording should occur. However, it is possible for the operator to strike the keys with such force, that the carriage 24 skips to its next column position. Since the absence of a depressed pin in a column 28 of carriage 24 characteristically represents a digit (in the example under consideration, a digit "9"), a mechanical entry will have occurred without a corresponding recording. This type of error should also be detected and is detected by the preferred embodiment of the invention.

The above errors are typical of those caused by the mechanical limitations of business machine 10 and in most cases are induced through operator error.

Another type of error which may arise is due to component failure and is separate and apart from operator-caused errors. That is, a mechanical entry may occur, but no recording of that entry takes place. Such an error may be induced through a signal-transmission failure between the business machine 10 and the recording device such as a tape recorder (not shown). This type of error is detected by the preferred embodiment of the invention.

The above-described errors are only typical of the errors that can occur. They are given by way of example and not limitation. The preferred embodiment of the invention not only detects the errors described above, but many others.

Referring now to FIG. 7, the general functional description of the apparatus constructed according to the invention will be given. The invention utilizes three sensing means to sense the proper position and direction of travel of the operated character key 14. In the preferred embodiment of the invention the first sensing means may be placed at a level between the numeric key mechanical interlock level NI (hereinafter called interlock level) and the reverse mechanical commitment level RMC. This first sensing means level is indicated generally by numeral 120 and will be hereinafter called the first sensing level. While the first sensing level 120 should be close to the reverse mechanical commitment RMC level it should be noted that the sensing level 120 may coincide with the RMC level but may not extend below the same. However, in practice it is difficult to make the level 120 coincide with the RMC level and it is practically impossible to maintain this relationship.

A second sensing means is provided at the same level at which coaxial switch 56 closes. This second sensing level will hereafter be referred to as such and given the general reference numeral 122.

A third sensing means is provided at a level below the forward mechanical commitment FMC level but above the bottom of the key stroke. The level at which the third sensing means is located will be referred to as the third sensing level and given the general reference numeral of 124. While the third sensing level 124 should be close to the forward mechanical commitment FMC level, it should be noted that the sensing level 124 may coincide with the FMC level but may not extend above the same. However, in practice it is difficult to make the FMC level coincide with 124 and practically impossible to maintain.

The sensing means are each generally composed of a pulse generator and a memory device. In the preferred embodiment of the invention the different sensing means differ in construction and the preferred constructions are described in detail below.

Figure 8:
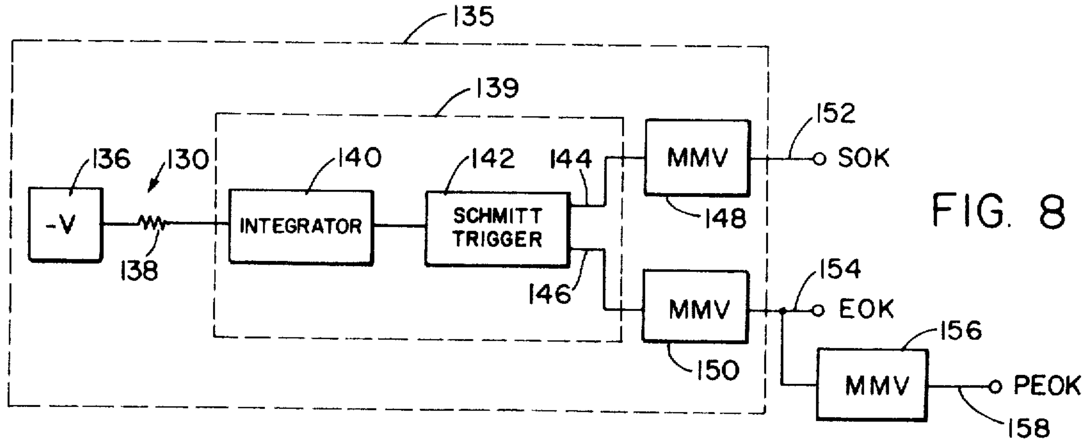
FIGS. 8, 9, 10 and 11 are schematic circuit diagrams, partially in block form, of portions of the apparatus constructed according to he present invention.

In accordance with the brief description above of the sensing of levels of travel, FIG. 8 illustrates the first sensing means which senses the first levels 120 of travel of information keys 14. The first sensing means includes a magnetic reed switch arrangement as shown in FIG. 6. More specifically, the pin box step bow 32 includes leg 36. As was described above, each of the character keys 14 is connected through linkage (not shown) and depresses the pin box step bow 32 every time the particular character key 14 is operated. Brackets 126 and 128 (FIG. 6) are mounted on each side of and parallel to leg 36. Bracket 126 carries a magnetic reed switch 130; bracket 128 carries a magnetic reed switch 132. A magnet 134 which is adapted to actuate magnetic reed switches 130 and 132 is carried by the leg 36 and is movable therewith.

Magnetic reed switch 130 is normally closed because of the close proximity of magnet 134 when the information keys are in their rest position. Magnetic reed switch 132 is normally open. However, when any one of the character keys 14 is depressed, the leg 36 moves downwardly, thereby moving the magnet 134 downwardly with respect to magnetic reed switches 130 and 132. As the downwardly moving magnet 134 moves away from magnetic reed switch 130, the switch opens. Similarly, as magnet 134 approaches magnetic reed switch 132, the switch closes. When the depressed character key 14 is released, the leg 36 moves upwardly under the action of an appropriate biasing means, such as a spring (not shown), to the normal or rest position. During its upward motion leg 36 carries the magnet 134 away from switch 132, allowing that switch to open. Similarly, switch 130 closes as leg 36 and magnet 134 approach and attain their rest position.

The magnet 134 and the magnetic reed switches 130 and 132 are positioned so that switch 130 opens (or closes depending on the direction of travel) when the character key 14 traverses the level 120 and the switch 132 closes (or opens depending on the direction of travel) when the character key 14 traverses the level 124.

Referring now to FIG. 8, the first sensing means in the preferred embodiment of the invention is seen.

The first sensing means senses an operated key 14 traversing the first sensing level 120 in first and second directions, the sensing in the first direction indicating a proper initiation of a key stroke and the sensing in the second direction indicating the return motion of the operated key 14. The first sensing means of the preferred embodiment of the invention comprises a first pulse generator and a third pulse generator. The first pulse generator, generally indicated by reference numeral 135, senses character keys 14 traversing first sensing level 120 in first and second directions and generates first and second pulses, respectively. It includes a voltage source 136. Connected voltage source 136. Connected to the output terminal of voltage source 136 is one terminal of resistor 138. The other terminal of resistor 138 is connected to the input of the reshaping network generally indicated by reference number 139 through the normally closed switch 130. The reshaping network 139 produces a signal on complementary outputs when the key 14 traverses the first sensing level 120 in both directions. It includes at its input integrator 140. The output of integrator 140 is connected to input of Schmitt trigger 142. Schmitt trigger 142 has two complementary outputs 144 and 146 which form the complementary outputs of reshaping network 139. Output 144 is normally in the logical zero state (throughout the following description the logical zero state should be assumed to be a zero voltage and a logical one state shall be assumed to be a negative voltage). Therefore, output 146 of Schmitt trigger 142 is normally in the logical one state (a negative voltage).

Output 144 is connected to monostable multivibrator 148. Output 146 is connected to monostable multivibrator 150. The operation of monostable multivibrators 148 and 150 is well known in the art. That is, when the input signal to monostable multivibrator 148 or 150 changes from a logical zero state to a logical one state, the monostable multivibrator produces at its output a logical one pulse of a predetermined duration. In the preferred embodiment the duration of this pulse is 100 Msec.

The output signal SOK of monostable multivibrator 148 appears on lead 152; the output signal EOK of monostable multivibrator 150 appears on lead 154.

The signal on lead 154 forms the input to monostable multivibrator 156. Monostable multivibrator 156 provides a third pulse generator. The output signal PEOK of monostable multivibrator 156 appears on lead 158. Monostable multivibrator 156 operates in the exact same manner as monostable multivibrators 148 and 150. However, the duration of the output pulse of monostable multivibrator 156 is 25 msec.

The operation of FIG. 8 is as follows: Switch 130 is normally closed as described above. When a character key 14 is depressed, magnet 134 is carried beyond switch 130, permitting switch 130 to open. Integrator 140 smooths out and eliminates any contact bounce (i.e., voltage variations to the input of Schmitt trigger 142 that would permit Schmitt trigger 142 to incorrectly vary its output). The change in voltage level at the input of Schmitt trigger 142 causes the outputs 144 and 146 to change logical states. That is, the state of output 144 goes from a logical zero to a logical one, causing monostable multivibrator 148 to produce pulse SOK at its output.

Similarly, at a later time, when magnet 134 is brought back into proximity of magnetic reed switch 130, switch 130 closes. As a result, the logical state of outputs 144 and 146 of Schmitt trigger 142 change. That is, the logical state of output 146 changes from a logical zero to a logical one causing monostable multivibrator 150 to produce a pulse EOK of specified duration on its output lead 154. The pulse EOK on lead 154 causes monostable multivibrator 156 to produce pulse PEOK on its output lead 158.

Summarizing the operation of FIG. 8, a pulse SOK of 100 $\mu$sec. appears on lead 152 at or near the initiation of the character key stroke. A pulse EOK of 100 $\mu$sec. also appears on lead 154 at or near the completion of a key stroke. Also, at the completion of a key stroke a pulse PEOK of 25 msec. appears on lead 158.

It is reemphasized at this point that the specific pulse duration is selected only for purposes of illustration and the satisfactory performance of the machine 10 in the illustrative example. One skilled in the art could easily vary the specified durations and accomplish the same purposes.

Figure 9:
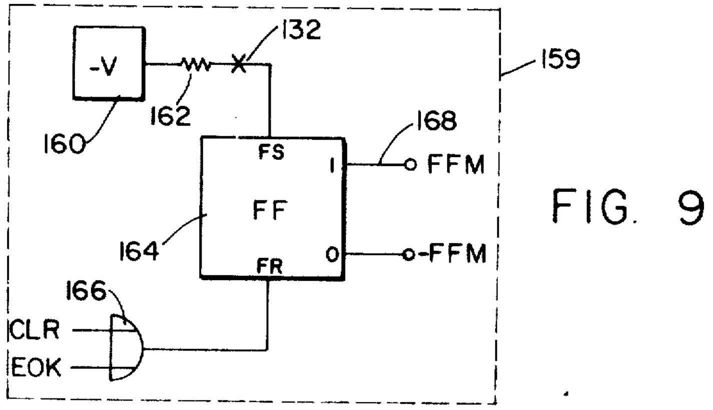

Referring now to FIG. 9, the third sensing means of the preferred embodiment of the invention is illustrated. The third sensing means senses the operated key 14 traversing the third sensing level 124 and indicates the completion of mechanical entry. It includes a memory device generally indicated by reference number 159. It has set and unset states, which change in response to the operated key 14 traversing the third sensing level 124 and in response to the key 14 traversing the first sensing level 120 in the second or upward direction. A negative voltage source 160 forms the input to resistor 162. The other terminal of resistor 162 is connected to the force-set input FS of so-called flip-flop 164 through the normally open switch 132. The flip-flop 164 is conventional in construction and is not described in detail herein. However, it should be noted that when a signal is applied to the force-set terminal FS of the flip-flop, a logical one signal appears at the "1" output and a logical zero signal appears at the "0" output. On the other hand, when a signal is applied to the force-reset terminal FR, a logical zero signal appears at the "1" output of the flip-flop and a logical one signal appears at the "0" output.

Also, in the first memory device 159 is an OR-gate 166. OR-gate 166 has two inputs in the preferred embodiment. One of these inputs is the signal EOK on lead 154 of FIG. 8. The other input of OR-gate 166 is a signal CLR, as discussed in detail below.

The output signal from OR-gate 166 forms the input for the force-reset input FR of flip-flop 164. In the present embodiment, when a signal is applied to the FS terminal, a signal FFM appears on the lead 168 which is connected to the "1" output of the flip-flop 164. Additionally, a signal FFM appears on the lead 169 which is connected to the "0" output of the flip-flop.

The third sensing means of FIG. 9 operates as follows. Switch 132 is normally open. When switch 132 is closed by magnet 134 moving near the switch 132, a negative voltage is impressed on the force-set input FS of flip-flop 164. This sets flip-flop 164 and produces the logical one signal FFM on lead 168. The signal FFM on lead 168 will be removed (i.e., returned to a logical zero) upon a pulse passed through OR-gate 166. This occurs either when the pulse EOK appears or when the CLR pulse appears.

Figure 10:
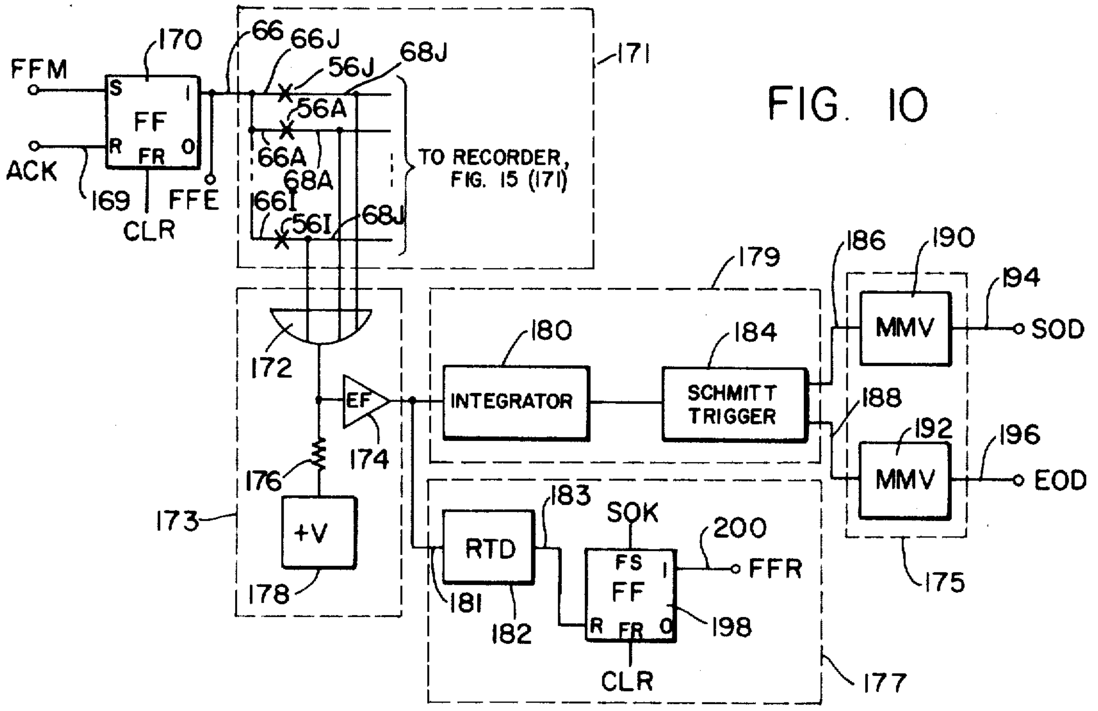

Referring now to FIG. 10 the second sensing means is illustrated. The second sensing means senses the operated key 14 traversing sensing level 122 in both directions. The sensing in the first or downward direction indicates the proper initiation of recording of data. The sensing in the second or upward direction indicates the return motion of the key 14. The second sensing means comprises a second pulse generator 175, a second memory device 170, a third memory device 177, and a record signal generator 171.

Figure 15:
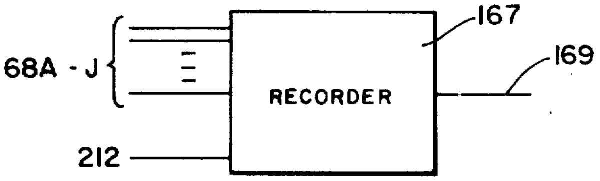
FIG. 15 shows the preferred embodiment of a recording means for recording a representation of the operated key.

In the preferred embodiment the second memory device comprises a flip-flop 170 having a set and reset state. The signal FFM is applied to the set input of flip-flop 170; applied to the reset input R of flip-flop 170 is a signal ACK. The signal FFM indicates key 14 has passed third sensing level 124, and sets flip-flop 170. The signal ACK comes from recorder 167 (shown in FIG. 15). Signal ACK indicates that recording has occurred and resets flip-flop 170. For example, suitable means for accomplishing this task are shown in U.S. Pat. No. 3,401,396. That is, a pulse on lead 24 of that patent indicates that electrical recording has occurred. More comprehensive embodiments for detecting correct electrical recording could utilize parity checks, playback and one-to-one correspondence checks, and other techniques well known in the art. The logical one signal FFE appearing at the output of flip-flop 170 is connected to the error sensor of FIG. 11 and the record signal generator generally referenced by number 171. Record signal generator 171 produces a signal which indicates which one of the keys 14 has been operated and includes coaxial switch 56. That is, the signal FFE output of flip-flop 170 is applied to each of leads 66 of coaxial switches 56. The other leads 68 of coaxial switch 56 form the inputs to connecting means 173. Lead 68 also forms the input to the recorder 167 (FIG. 15). Connecting means 173 connects the record signal generator 171 to the second pulse generator, indicated generally by number 175, and the third memory device, indicated generally by number 177. Leads 168 are connected to connecting means 173. The signals appearing thereon form the inputs to OR-gate 172.

The output signal of OR-gate 172 forms an input to emitter-follower amplifier 174. Also connected to the same input of emitter-follower amplifier 174 is one terminal of a resistor 176. The other terminal of resistor 176 is connected to positive voltage source 178.

The output of emitter-follower amplifier 174 or connecting means 175 is connected to the second pulse generator 175 and the third memory device 177. The second pulse generator 175 senses for key 14 traversing the second sensing level 122 in the first and second directions and generates a pulse indicative of such traversals. It includes integrator 180 whose input is connected to the output of connecting means 173. The output signal of integrator 180 forms the input to Schmitt trigger 184. Integrator 180 and Schmitt trigger 184 comprise a reshaping network similar to reshaping network 139 described above. Schmitt trigger 184 changes states when its input changes from a positive voltage state (+V volts) to the logical zero state (zero volts) and vice versa. There is no change in states when the input varies from the logical zero state (zero volts) to the logical one state (−V volts).

Schmitt trigger 184 has two complementary outputs connected to leads 186 and 188, respectively. Lead 186 is connected to monostable multivibrator 190; lead 188 is connected to monostable multivibrator 192. The output signal SOD of monostable multivibrator 190 is applied to lead 194; the output signal EOD of monostable multivibrator 192 is applied to lead 196.

The third memory device 177 has a set and reset state. It sets in response to the SOK pulse on lead 152, indicating a proper initiation of a key stroke, and resets after a logical one state has been applied to its input for a predetermined duration, indicating that key 14 has passed second sensing level 122, closed a coaxial switch 56 securely and that a record signal has been properly passed through record signal generator 171 for the predetermined duration. Third memory device 177 includes recoverable time delay 182. Recoverable time delay 182 produces a logical one state output pulse after a logical one state (a negative voltage) has been applied to its input for a predetermined duration. (See FIG. 14 and accompanying description). The output of recoverable time delay 182 is connected to the reset input R of flip-flop 198. The signal SOK on lead 152 of monostable multivibrator 148 forms the input to the force-set input FS of flip-flop 198. The force-reset input FR of flip-flop 198 is connected to lead 222 which carries the CLR signal. The "1" output of flip-flop 198 is connected to lead 200 which carries an FFR signal.

The second sensing means of FIG. 10 operates as follows. Normally, there is no FFE pulse or signal at the "1" output of flip-flop 170. However, when an FFM signal appears upon lead 168, flip-flop 170 sets and the signal FFE is applied to leads 66. Since signal FFM does not appear upon lead 168 unless switch 132 has been closed, and switch 132 does not close unless the character key has been depressed through the level at which coaxial switch 56 close (second sensing level 122), one of the switches 56 will be closed (only one can be closed because of the interlock means shown in FIG. 3). Thus, signal FFE will be sent to the recorder 167 (FIG. 15) and to one input of OR-gate 172.

Since the signal FFE is a logical one and is indicated in the preferred embodiment by a negative voltage, the voltage at the input to emitter-follower 174 will fall. Integrator 180 performs the same function as integrator 140 in FIG. 8. That is, it smooths out all quick voltage variations due to contact bounce and permits only substantial voltage changes due to actual contact opening and closing to pass. The signal applied to the input of Schmitt trigger 184 causes leads 186 and 188 to change state. That is, the logical state of lead 186 changes from logical zero state to a logical one state. This change causes monostable multivibrator 190 to produce a pulse SOD of fixed duration (100 μsec.).

The third memory device 177 has been set by the signal SOK appearing on the lead connected to output 152. That is, flip-flop 198 has been set by signal SOK appearing at its force-set input FS. Recoverable time delay 182 will produce a signal only if the signal at the input remains constant for a duration of 2 msec. in the preferred embodiment. Upon the signal being produced by recoverable time delay 182, flip-flop 198 is reset. That is, the signal FFR is produced. Recoverable time delay 182 insures that the contacts of coaxial switch 56 remain closed for a specified length of time and that they are closed sufficiently tight to ensure good signal transmission to the recorder (shown in FIG. 15). That is, they ensure that the pulse generated by second memory device 170 is properly passed through record signal generator 171 for the predetermined duration.

Figures 11, 12:
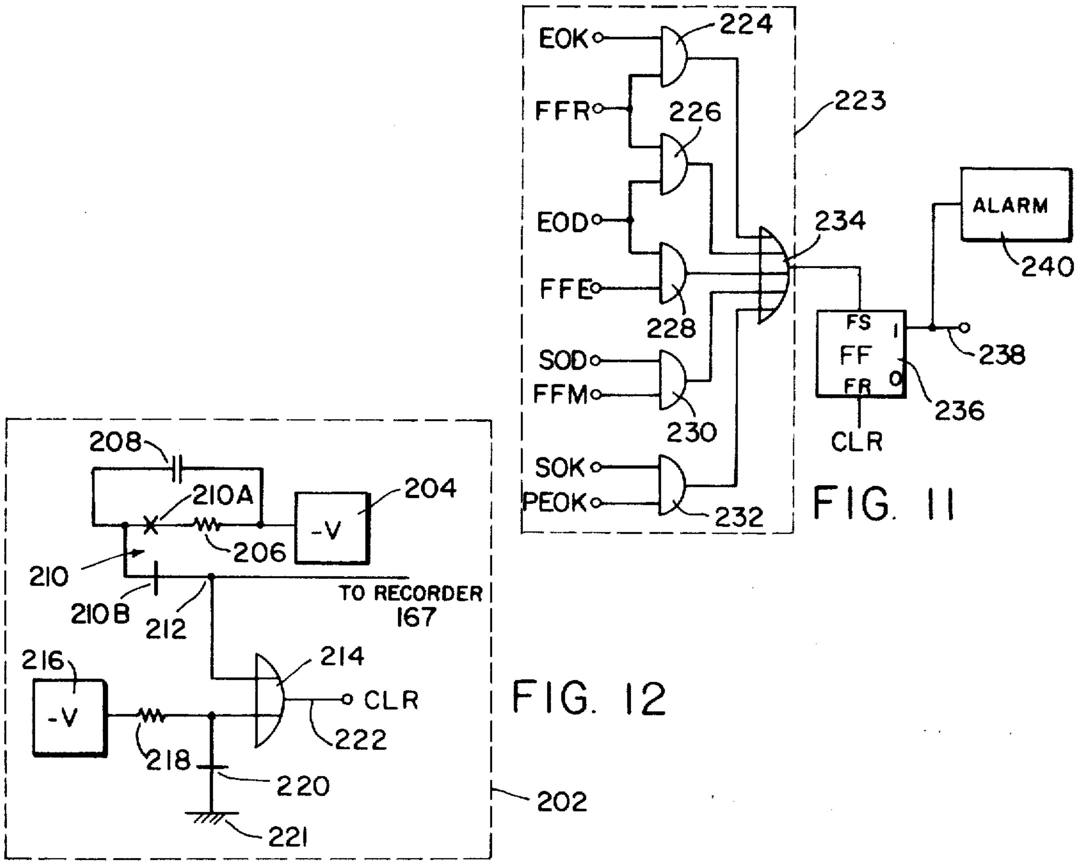
FIG. 12 is a schematic circuit diagram of the clear means constructed according to the preferred embodiment of the invention.

In FIG. 12 there is illustrated the correction or clear signal generator generally indicated by reference numeral 202. Clear signal generator 202 is manually activated by an operator and resets first, second, and third memory devices 159, 170 and 177, respectively. It also causes electrical recording 167 to record a representation of a clear signal. Clear signal generator 202 comprises a voltage source 204. Voltage source 204 is connected to one terminal of resistor 206 and one terminal of a capacitor 208. The other terminal of resistor 206 is connected to one terminal of a normally open contact 210A of a correct switch 210 which also includes normally closed contacts 210B. The other terminal of normally open contacts 210A of correct switch 210 is connected to lead 212. The signal on lead 212 forms an input to the recorder 167 resulting in the recorder 167 recording a representation of the operation of the correct switch 210.

To be more specific, the machine 10 includes a clear slide which is common to machines of the type under consideration. When the operator of a machine begins to enter a number and makes an error in entering one of the digits, he operates the clear slide. Operation of the slide causes the depressed pins in the pin box memory to move back to the normal or rest position and the carriage is moved back to the first column position without any changes in the machine accumulator. Hence the characters entered into the machine just prior to the operation of the clear slide are effectively cleared or erased.

In the illustrative example, the switch 210 may be connected to the clear slide by an appropriate mechanical linkage so that when the clear slide is operated the switch 210 is similarly operated whereby switch contacts 210A close and switch contacts 210B open. The clear slide, like the keys 14 is spring loaded to return to the rest position so that contacts 210A open and 210B close upon release of the slide.

Lead 212 also forms one input to OR-gate 214. A negative voltage source 216 is connected to a resistor 218. The other terminal of resistor 218 is connected to a jam-release switch 220 and the other input of OR-gate 214. Jam-release switch 220 is normally closed and is typically of the momentary push-button switch type. The other terminal of switch 220 is connected to ground 221.

The output of OR-gate 214 is connected to lead 222 and produces a signal CLR on this lead. The CLR signal is applied to the memory devices 159, 170 and 177 of FIGS. 9 and 10. That is, signal CLR forms an input to OR-gate 166 whose output signal forms the input of the force-reset input FR of flip-flop 170, and a direct input to the force-reset input FR of flip-flop 198.

The operation of FIG. 12 is as follows. After a discrepancy error is sensed or a wrong digit entry is recognized, the operator operates the clear slide to remove the digits thus far entered into the machine for the particular entry under consideration. Thus a signal appears at the input to OR-gate 214 and the CLR signal appears on lead 222.

Similarly, if the machine 10 jams, the proper dejaming device is operated which also clears the digits thus far entered into the pin box memory and returns the carriage to the first column position. The jam-release switch 220 may be connected to the dejaming device so that the switch 220 operates simultaneously with the dejaming device. The operation of the switch 220 causes a signal (a negative voltage) to be applied to the gate 214 which causes the CLR signal to appear on lead 222. As noted above, the CLR signal clears the memory devices to which it is connected and the inhibit means 236 of FIG. 11.

Referring now to FIG. 11, the error sensor is illustrated. It responds to the above-described sensing means of FIGS. 8, 9 and 10, and indicates an error condition by detecting whether said sensing means have sensed the character key 14 traversing the various sensing levels in the proper sequence among other sensing operations. The error sensor comprises a detecting stage responsive to the signals produced by the various above-described signal generators and memory devices.

In the preferred embodiment, the detecting stage, generally referenced by number 223, comprises AND-gates 224, 226, 228, 230, and 232. Signals EOK and FFR form the inputs to AND-gate 224; signals FFR and EOD form the inputs to AND-gate 226; signals EOD and FFE form the inputs to AND-gate 228; signals SOD and FFM form the inputs to AND-gate 230; and, signals SOK and PEOK form the inputs to AND-gate 232. The output signals of AND-gates 224 through 232 form the inputs to OR-gate 234. The output of OR-gate 234 forms the input to the force-set terminal FS of a JK flip-flop 236.

Flip-flop 236 acts as an inhibit signal generator in the preferred embodiment of the error sensor of FIG. 11. The inhibit signal generator (flip-flop) 236 is responsive to a signal from the detecting stage 223 applied to the force-set input FS to produce an ERR signal on the lead 238 which is connected to the "1" output terminal of the flip-flop. As noted below, in conjunction with the description of FIG. 13, the ERR signal inhibits further function cycles of the machine 10 by causing the function cycle motor to remain deenergized during the interval that the ERR signal is present.

The ERR signal forms an input to the alarm device or indicator comprising alarm 240. Alarm 240 notifies the operator, visually, audibly, etc., of an error.

The error sensor of FIG. 11 operates as follows. Whenever the two signal inputs of any one of the AND-gates 224 through 232 are present, that AND-gate produces a signal at its output. That signal passes through OR-gate 234 to the force-set terminal FS of flip-flop 236 thereby producing the ERR signal on the lead 238. The ERR signal on lead 238 actuates alarm 240. (A more detailed functional description of FIG. 11 is given below in conjunction with the overall operation of the preferred embodiment of the invention.)

Figure 13:
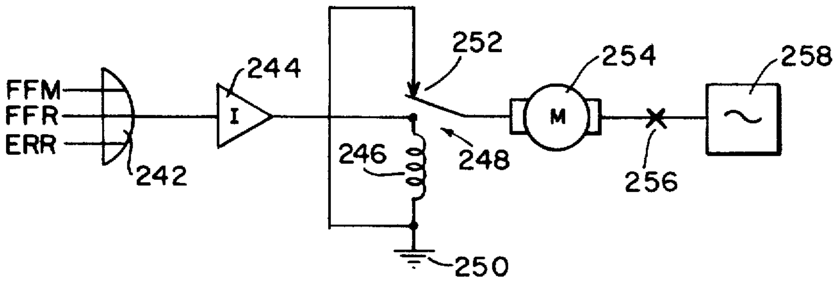
FIG. 13 is a schematic diagram of the motor power switch means made according to the preferred embodiment of the invention.

Illustrated in FIG. 13 is the preferred embodiment of the power switch circuit which deenergizes the function cycle mechanism of the machine 10 in response to either the ERR, FFM or FFR signals. To be more specific, as noted above the machine 10 performs certain functions such as add, subtract, total, subtotal, etc. The source of power for the operation of the machine 10 during a function cycle is a motor 254. However, if the motor 254 is disconnected from an energy source the motor will remain inoperative and, as a result, the machine 10 cannot perform any of the function operations.

The power switch circuit comprises an OR-gate 242 which is adapted to receive the signals ERR, FFM and FFR at its respective input terminals. The output signal of OR-gate 242 forms the input signal to an inverting amplifier 244. The output of inverting amplifier 244 is connected to one terminal of coil 246 of relay 248. The other terminal of coil 246 is connected to ground 250.

Also connected to ground 250 is one terminal of normally closed relay switch 252. The other terminal of switch 252 is connected to one terminal of motor 254. The other terminal of motor 254 is connected to one terminal of motor bar switch 256. Motor bar switch 256 is connected by linkage (not shown) to function keys 16. When a function key 16 is operated by an operator, switch 256 closes, allowing power to be applied to function cycle motor 254. Function keys 16, switch 256, motor 254 are all included within the function cycle mechanism of machine 10. The other terminal of motor bar switch 256 is connected to alternating voltage source 258.

The operation of FIG. 13 is next described. The power switch circuit removes power from the function cycle motor 254 from the time an operator initiates a key stroke until after proper completion of the key stroke. If the key stroke is not properly completed the power switch circuit does not return power to the motor 254 until the operator has recognized the problem, and has cleared the machine 10 through the clear slide and recorded a corresponding clear signal CLR via the clear signal generator of FIG. 12. By removing power from the function cycle motor 254 prior to the detection of an error, the possibility of energizing the motor after an error has occurred as by quickly operating a function cycle key after a partial information key stroke is eliminated.

Whenever a ERR, FFR or FFM signal appears at the respective inputs of OR-gate 242 an output signal is produced. Accordingly, power is applied to coil 246 through inverting amplifier 244. This opens the contacts of relay switch 252, breaking the closed circuit between motor 254 and ground 250.

Referring to FIG. 10, an FFR signal appears on lead 200 at the initiation of a key stroke. That is signal FFR on lead 220 reflects that flip-flop 198 has been set. Flip-flop 198 is set upon the opening of switch 130 in response to the SOK signal. Switch 130 opens after the key 14 has traveled in a downward or first direction past first sensing level 120. Similarly, signal FFM appears on lead 168 (FIG. 9) when the key 14 has advanced through the third sensing level 124 which causes flip-flop 164 to set. The signal ERR appears on lead 238 (FIG. 11) whenever an error condition is recognized.

The signal FFR on lead 200 is removed when flip-flop 198 is reset. Similarly, the signal FFM on lead 168 is removed when flip-flop 164 is reset, (i.e., when the first sensing level 120 is crossed in the upward or second direction causing monostable multivibrator 150 to produce signal EOK on lead 154 thereby resetting flip-flop 164 through OR-gate 166). Thus, when a signal appears on any one of leads 168, 200 or 238, the motor 254 is inhibited from operating. That is, even though normally open motor bar switch 256 might close under the operator's depression of a function cycle button 16 of machine 10, it will not initiate a function cycle since no current can flow through motor 254 due to the break in the circuit at relay contact 252.

Figure 14:
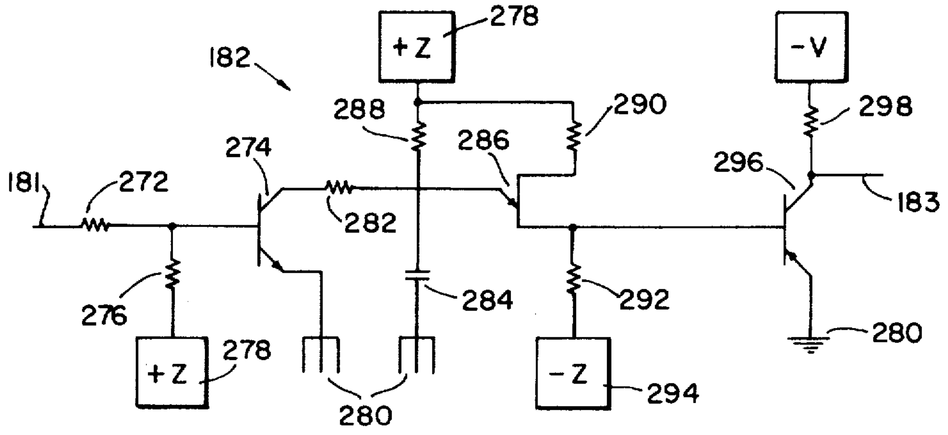
FIG. 14 is a schematic diagram of the time delay circuit shown in FIG. 9.

Reference is now made to FIG. 14 illustrating the retriggerable or recoverable time delay used in the preferred embodiment. Lead 181 is connected to one terminal of resistor 272. The other terminal of resistor 272 is connected to the base of transistor 274 and one terminal of resistor 276. The other terminal of resistor 276 is connected to the output of positive voltage source 278 (+V volts).

Transistor 274 is of the NPN type. The emitter of transistor 274 is connected to ground 280. The collector of transistor 274 is connected to one terminal of resistor 282. The other terminal of resistor 282 is connected to one terminal of capacitor 284, the emitter of unijunction transistor 286, and one terminal of resistor 288. The other terminal of capacitor 284 is connected to ground 280. The other terminal of resistor 288 is connected to the output of positive voltage source 278 and one terminal of resistor 290. The other terminal of resistor 290 is connected to base two of unijunction transistor 286. The base one of unijunction transistor 286 is connected to one terminal of resistor 292, and to the base of transistor 296. The other terminal of resistor 292 is connected to negative voltage source 294 (−V volts).

Transistor 296 is of the PNP type. The emitter of transistor 296 is connected to ground and the collector is connected to one terminal of resistor 298 and lead 183. The other terminal of resistor 298 is connected to negative voltage source 294. Lead 183 is the output lead of retriggerable time delay 182.

The operation of retriggerable time delay 182 is as follows. Normally, transistor 274 is biased so it is in saturation conduction. Since the transistor 274 is conducting, no charge can accumulate on the plates of capacitor 284. Thus, unijunction transistor 286 is in a nonconducting state. When a negative pulse appears upon lead 181, transistor 274 is biased off. According to the time constant dictated by the RC circuit comprising resistor 288 and capacitor 284, a charge builds up on the plates of capacitor 284. When the voltage across capacitor 284 is equal to the firing voltage of unijunction transistor 286, transistor 286 fires. The voltage on the base of transistor 296 rises, causing transistor 296 to turn "off". The voltage decreases on lead 183 to the amplitude of the negative source 294 indicating a logical one state.

It will be noticed that a negative voltage does not appear upon lead 183 until the firing potential for the unijunction transistor is reached across capacitor 284. This will not happen unless transistor 274 conducts for a predetermined duration. Transistor 274 will not conduct for this predetermined duration unless the signal at its base remains at a negative voltage for the predetermined duration without interruption. This provides the necessary check on the quality of the signal transmitted by coaxial switches 56.

Referring to FIG. 15 the preferred embodiment of the recorder 167 is shown. The electrical recording means respond to indicating means 171 and second memory means 170 by recording a representation of the operated key 14 upon the setting of second memory means 170. A pulse is produced by the electrical recording means indicating that the representation of the operated key has been recorded. This logical one state pulse resets second memory means 170 insuring that only a single recordation occurs. A suitable recorder is described in the above-referenced U.S. Pat. No. 3,401,396. As described above, lead 169 is identical to lead 24 of the referenced patent.

As noted above, the signals on the leads 68A–J and 212 are encoded into a suitable representation and recorded on a suitable record medium. After recording, the ACK signal appears on lead 169 indicating correct recording of the information.

OPERATION OF THE INVENTION

A short description of the operation of the invention follows. An operator selects one of the character keys 14 to operate. He operates the character key 14 by depressing it. As the character key 14 starts its downward travel, it passes through the level where the mechanical interlock means shown in FIG. 3 became operative. That is, the mechanical interlock means prevents any other character key 14 from passing through that level to the first sensing level 120 at which magnetic reed switch 130 opens, or the lower level at which coaxial switches 56 close. (See FIG. 7 for the spatial relationship between different levels of character key 14 travel.)

The continued downward travel of the key causes magnet 134 to be carried downwardly away from magnetic reed switch 130. As the key passes the point corresponding to the first sensing level 120, magnetic reed switch 130 opens. Referring to FIG. 8, the opening of magnetic reed switch 130 causes monostable multivibrator 148 to produce signal SOK on lead 152. This indicates that the character key is travelling in the downward or first direction. The pulse SOK on lead 152 causes flip-flop 198 of FIG. 10 to set. The setting of flip-flop 198 produces the FFR signal on lead 200. Signal FFR forms one input to the error sensor of FIG. 11 and the power switch circuit of FIG. 13. The latter circuit will remove power from the motor 254 preventing operation of the function keys 16 during further operation of keys 14.

As character key 14 continues in the first or downward direction, it passes through the second sensing level 122 at which the associated coaxial switch 56 closes. In FIG. 10 the closing of one of the coaxial switches 56 is seen to lower the voltage level at the input of emitter-follower amplifier 174 from the positive voltage (+V volts) from source 178 to zero volts. That is, since flip-flop 170 is not set, a logical zero state or zero voltage appears upon its output. When one of the switches 56 is closed, this zero level voltage is connected through OR-gate 172 and resistor 176 to voltage source 178. This lowers the voltage at the input to emitter-follower amplifier 174 to zero volts. Only the integrator 180 is affected by this change in voltage (retriggerable time delay 182 needs a logical one state or a negative voltage to affect its output). The output signal of integrator 180 through Schmitt trigger 184 and monostable multivibrator 190, causes an SOD signal to appear on lead 194. Thus the SOD pulse on lead 194 indicates that the character key 14 has passed through the coaxial switch 56 level in a downward or first direction. Signal SOD forms an input to the error sensor of FIG. 11.

As the character key 14 continues its downward travel, it passes through the forward mechanical commitment FMC level (see FIG. 7). Below the forward mechanical commitment FMC level is the third sensing level 124. Located at this level is magnetic reed switch 132. As magnet 134 approaches magnetic reed switch 132, magnetic reed switch 132 closes. Referring to FIG. 9, the closing of magnetic reed switch 132 sets flip-flop 164. The setting of flip-flop 164 results in a signal FFM state one lead 168. Thus, a signal FFM on lead 168 indicates that the character key 14 has traversed the third sensing level 124 in the first or downward direction. This also indicates that the character key has passed through the forward mechanical commitment FMC level. Moreover, the signal FFM on lead 168 continues to gate the power switch circuit of FIG. 13 so that power is not restored tom motor 254 when flip-flop 198 is reset.

The signal FFM on lead 168 sets flip-flop 170 of FIG. 10. This results in the FFE signal at the "1" output of flip-flop 170. Thus, a logical one state or negative voltage level is applied to the input of emitter-follower amplifier 174 through the already closed coaxial switch 56 and OR-gate 172.

The change in voltage level from a zero level to a negative level at the input of retriggerable time delay 182 results in a change of voltage level at the output of recoverable time delay 182 a specified time later, if, and only if, the voltage level at the input remains constant during this time duration. This will occur unless the contacts of switch 56 are dirty or otherwise interfere with the transfer of signals from flip-flop 170 to the retriggerable time delay 182. Thus, retriggerable time delay 182 provides a measure of the quality of the signal which passes through switches 56. The output of retriggerable time delay 182 resets flip-flop 198. Thus, the signal FFR on lead 200 is removed. It should also be noted from FIG. 10 that the setting of flip-flop 170 results in the passage of the signal FFE through the operated switch 56 to the recorder of FIG. 15 to effect a recording of the information entered into the machine.

Approximately 3 to 5 msec. following the receipt of the signal on the appropriate data lead to the recorder, the recorder transmits the ACK signal via the record-confirmation lead 169 that the information, corresponding to the operated character key 14 has been recorded. The ACK signal on lead 169 resets flip-flop 170. The signal FFE is removed (i.e., the voltage level on lead 66 changes from a logical one to a logical zero). This action assures a single recording during a single key stroke independently of the bounce characteristics of magnetic reed switch 130.

As the operator removes pressure from the operated character key 14, that key 14 begins travelling in an upward or second direction. The operated key 14 carries magnet 134 upwardly away from magnetic reed switch 132, allowing that switch to reopen. This has no functional result in the preferred embodiment of the invention. The key continues to travel in the upward or second direction. Eventually the second sensing level 122 at which coaxial switches 56 reopen is passed. Before passing this level, note that the voltage at the input of emitter-follower 174 had returned to the logical zero state or zero voltage level (flip-flop 170 had been reset by the ACK pulse upon lead 169 returning its output to zero voltage). As the particular switch 56 that had been closed reopens, the voltage at the input of emitter-follower amplifier 174 changes from zero volts to a positive voltage (+V volts). That is, the zero voltage present at the output of flip-flop 170 is removed from the input of emitter-follower amplifier 174. This change in voltage level is transmitted by emitter-follower amplifier 174 through integrator 180 to Schmitt trigger 184. Schmitt trigger 184 triggers monostable multivibrator 192 so that an EOD pulse appears upon lead 196. The EOD signal on lead 196 forms an input to the error sensor of FIG. 11.

As the character key 14 approaches the end of its travel in the upward or second direction, it crosses the reverse mechanical commitment RMC level. At this level, the carriage 22 steps to its next rest position and is ready for entry of the next character. Shortly after crossing the reverse mechanical commitment RMC level, the character key 14 crosses the first sensing level 120. At this point, magnet 134 is brought into proximity with switch 130, forcing switch 130 to close. The closing of switch 130 causes a triggering pulse to be applied to Schmitt trigger 142 to cause it to return to its original state. Thus, monostable multivibrator 150 produces an EOK signal causing, in turn, monostable multivibrator 156 to produce a PEOK signal.

The EOK signal on lead 154 lasts for a predetermined duration of 100 $\mu$sec. This EOK signal indicates that the character key has neared the proper completion of its travel in the upward or second direction. The EOK signal on lead 154 is applied to OR-gate 166 (FIG. 9). The output signal of OR-gate 166 resets flip-flop 164. The output signal FFM on lead 168 is removed to a logical zero state and the power switch circuit of FIG. 13 completes the power circuit to motor 254 upon closure of switch 252. Accordingly, upon closure of the motor bar switch 256, the motor 254 will be energized.

The signal EOK on lead 154 also is applied to AND-gate 224 of the error sensor of FIG. 11. The signal PEOK on lead 158 lasts for an interval of 25 msec. in the preferred embodiment. This duration is selected so as to be slightly longer than the time necessary for the carriage to move from one rest position to the next upon completion of a given key stroke. That is, as explained below, signal PEOK on lead 158 and the signal SOK on lead 152, indicating the initiation of the next keystroke, causes an error condition to arise. This error condition recognizes that the operator is "slurring" (operating the keys in too quick a succession).

A discussion is now given to some of the various error conditions that can arise during the operation of machine 10. Reference should be made particularly of the FIGS. 7 and 11. The left-most key stroke, graph 74, of FIG. 7 is illustrative of a complete, correctly operated key stroke. In graph 93 the third sensing level 124 has not been crossed by the key. Thus, a signal SOK appears upon lead 152 indicating transversal of the first sensing level 120 in the first direction. The SOK signal on lead 152 sets flip-flop 198 causing a signal FFR on lead 200. Since the third sensing level 124 is not crossed during the key stroke, flip-flop 165 does not reset. Without flip-flop 164 setting, flip-flop 198 can not be reset. Thus, when the key 14 crosses the first sensing level 120 in the second or upward direction, the signal EOK on lead 154 is simultaneously present with the signal FFR on lead 200. Accordingly, a signal is produced at the output of AND-gate 224 of FIG. 11, setting flip-flop 236 and causing alarm 240 to be energized. One skilled in the art can easily recognize that this alarm condition will always exist when key 14 crosses the first sensing level 120 without crossing the third sensing level 124 (i.e., without committing the machine).

Another alarm condition is produced by the key stroke represented by the graph 118 of FIG. 7. Thus, a pulse FFR appears on lead 200 by key 14 passing through the first sensing level 120. As the key 14 continues its downward travel it passes through the second sensing level or the location of coaxial switch 56. The key then passes through the forward mechanical commitment FMC level. However, although the key has passed through the forward mechanical commitment FMC level, the key is not depressed far enough to pass through the third sensing level 124. This would normally result in an alarm condition as described immediately above when the key passed through the first sensing level 120 in the upward or second direction. However, in the present example, the key is not immediately passed through the first sensing level, but, because of the operator's uneven pressure, the key is moved in the first or downward direction immediately after passing through the reverse mechanical commitment RMC level. The key then continues in its downward direction (referred to as line 264). It passes through the third sensing level 124 and again returns to its rest position at point 266. Since the first sensing level has been traversed in the second direction after the third sensing level has been traversed, the alarm condition discussed immediately above will not occur. However, during the first upward traversal of the second sensing level 122 where coaxial switches 56 are located, a signal EOD appears on lead 196. Since flip-flop 198 has not been reset, AND-gate 226 of FIG. 11 recognizes the coincidence of signals EOD and FFR. Thus, alarm 240 is energized at alarm point 268 of the graph. Also recognized is an error condition arising through dirty or open coaxial switches 56. That is, flip-flop 198 will not be reset since the negative voltage level necessary to trigger retriggerable time delay 182 could not pass through coaxial switches 56 if they remain open due to dirt, etc.

Another alarm condition is illustrated by the key stroke represented by graph 102. This alarm occurs at point 110 when it detects an improper key stroke in the upward or second direction preceded by a proper key stroke in the forward or first direction. That is, flip-flop 164 is set by the key 14 traversing the third sensing level 124. Thus, a signal FFM appears on lead 168. Since the key 14 during travel in the upward or second direction does not pass through first sensing level 120, flip-flop 164 is not reset (no EOK signal appears upon lead 154 from FIG. 8). Thus, when the key 14 again traverses the second sensing level 122 in the first or downward direction, a signal SOD appears on lead 194. This coincidence of signals SOD and FFM is detected by AND-gate 230 of FIG. 11 thereby energizing alarm 240. This alarm condition is also redundant to the alarm condition immediately above for open or dirty coaxial switches 56.

The last alarm condition due to an improper key stroke of the types shown in FIG. 7 is illustrated by the graph 112. This alarm occurs at alarm point 270. This alarm condition arises by key slurring or overspeeding. That is, when two keys 14 are operated by the operator within a predetermined duration of one another which is shorter than the time interval for mechanical recovery of the machine, an alarm condition occurs. This alarm is necessitated by the finite time it takes the mechanical components of machine 10 to complete their functions. This finite time is preset by the signal PEOK output of monostable multivibrator 156 of FIG. 8. This slurring action is recognized by AND-gate 232 when signals SOK and PEOK appear simultaneously upon leads 152 and 158. That is signal PEOK appears on lead 158 at the end of key stroke. Upon the initiation of the next key stroke, signal SOK appears on lead 152 when key 14 traverses the first sensing level 120 in the first or downward direction. If a pulse appears on lead 152 during the time monostable multivibrator 156 is producing an output signal PEOK, alarm 240 is energized through flip-flop 236 by the output of AND-gate 232 and OR-gate 234 of FIG. 11.

Other alarm conditions are also recognized by the preferred embodiment of the invention. One of the more important of these occurs when the recorder does not indicate the proper recording has occurred. This alarm condition is sensed in the preferred embodiment through a coincidence of signals FFE and EOD on leads 66 and 196. That is, flip-flop 170 is normally set when key 14 traverses the third sensing level 124. After recording in the recording device 167 a signal ACK appears on lead 169 resetting flip-flop 170. If this does not occur before key 14 has traversed the second sensing level 122 in the second direction, the resultant pulse on lead 196 will coincide in time with the signal FFE on leads 66. Thus, a signal will be produced at the output of AND-gate 228 of FIG. 11, thereby energizing the alarm 240.

Another alarm condition recognized by the preferred embodiment is the improper stepping of carriage 22 by striking two keys 14 with sufficient force to move the carriage. That is, although neither of the two keys will penetrate through the numeric key mechanical interlock level, the shock of the coincident operation of keys 14 may be sufficient to cause the escapement mechanism (not shown) of carriage 24 to be activated through spatial displacement of pin box step bow 32. This condition can be sensed by placing the first sensing level 120 sufficiently close to the numeric key mechanical interlock NI level. That is, although the keys 14 technically do not pierce the numeric key mechanical interlock level, the shock is sufficient to carry them past the first sensing level 120, if the first sensing level is close enough to the numeric key mechanical interlock level. This condition is sensed by AND-gate 224 of FIG. 11. That is, a logical one appears upon lead 200 through the setting of flip-flop 198 when key 14 traverses the first sensing level in the first direction. When the operator removes the pressure from the keys, they will traverse the first sensing level in the second or upward direction. This causes a logical one state upon lead 154. The presence of logical one states upon leads 154 and 200 results in alarm 240 being set through AND-gate 224, OR-gate 234, and flip-flop 238.

Accordingly, an error-detecting apparatus for a key stroke-operated business machine has been disclosed which efficiently and effectively detects discrepancies which may exist between the information entered into the machine and the record representing such entries.

While a preferred embodiment of the invention has been shown and disclosed herein, it will be obvious that many omissions, changes and additions may be made in such embodiment without departing from the spirit and scope of the present invention.

What is claimed is:

1. An error detector for detecting errors in the operation of a business machine adapted to mechanically receive data and to record such data by the operation of character keys, including:

first pulse-generating means sensing one of said keys traversing a first level in first and second directions and generating first and second pulses, respectively;

first memory means having at least a set and a reset state, said first memory means moving to the set state in response to said one key traversing a third level and moving to the reset state in response to said second pulse;

second memory means having at least a set and reset state and being responsive to the set state of said first memory means to move to the set state of to an acknowledge pulse to move to the reset state;

third memory means having at least a set and reset state and being responsive to said first pulse to move to the set state;

record signal-transmitting means for transmitting a record signal indicating which of said keys is operated;

recording means responsive to said record signal-transmitting means and said second memory means for recording a representation of the operated key in response to the setting of said second memory means and for producing said acknowledge pulse to move said second memory means to the reset state; and an error sensor including first means responsive to said second pulse when said third memory means is in said set state for producing an error signal.

2. An error detector as in claim 1, including second pulse generating means sensing said one key traversing a second level in a second direction and generating a fourth pulse in response thereto and in which said error sensor comprises second means responsive to said fourth pulse when said third memory means is in said set state for producing an error signal.

3. An error detector as in claim 2, in which said error sensor comprises third means responsive to said fourth pulse when said second memory means is in the set state for producing an error signal.

4. An error detector as in claim 1, in which said second pulse-generating means sensing said one key traversing a second level in a first direction and generating a third pulse in response thereto and said error sensor comprises fourth means responsive to said third pulse when said first memory means is in said set state for producing an error signal.

5. An error detector as in claim 1, in which said machine includes a power-operated function cycle mechanism, and inhibit means responsive to said error signal for inhibiting the operation of said function cycle mechanism.

6. An error detector as in claim 1, including third pulse-generating means responsive to said second pulse for generating a fifth pulse, and said error sensor comprises fifth means responsive to the coincidence of said first and fifth pulses for generating an error signal.

7. An error detector as in claim 1, and clear means operable to move said first, second and third memory means to the reset state, and to produce a clear record signal, said recording means being responsive to said clear record signal for recording a representation of the operation of said clear means.

8. An error detector as in claim 1, in which said machine is provided with a mechanical interlock operable to prevent the movement of more than one of said keys beyond an interlock level, said first level being positioned slightly below said interlock level.

9. An error detector as in claim 1, in which said third memory means includes timing means for said third memory means to the reset state in response to the transmission of said record signal by said record signal-transmitting means for a preselected interval of time.

10. Error-detecting apparatus for detecting errors between the entry of information in a business machine of the type having a plurality of selectively and individually operable information keys movable between a rest and a first commitment level to enter information into the machine and a record of such information comprising entry means responsive to the operation of each of said plurality of information keys from said rest to said first commitment level for entering information into the machine representing the operated information keys, recording means operable by a record signal for converting the information represented by the operated information keys into recordable signals and for recording such signals on the record medium, sensing means for generating said record signal in response to the movement of an information key to at least said first commitment level and for sensing if a discrepancy exists between the information entered into the machine and the record representing such information to produce an error signal if such discrepancy exists, and error-indicating means responsive to the error signal produced by said sensing means when such discrepancy is sensed for indicating an error.

11. Error-detecting apparatus as in claim 10, in which said sensing means comprises first sensing means for producing a start signal in response to the movement of said information keys past a first point, in a first direction and an end signal in response to the movement of said information keys past said first point in a second direction, and first error-detecting means responsive to the presence of said end signal and the absence of said record signal for producing said error signal.

12. Error-detecting apparatus as in claim 11, in which said sensing means comprises second sensing means for producing a start signal in response to the movement of said information keys past a second point in a first direction and an end signal in response to the movement of said information keys past said second point in a second direction, said second point being located intermediate said first point and said first commitment level, and second error-detecting means responsive to the presence of said second sensing means end signal and the absence of said record signal for producing said error signal.

13. Error-detecting apparatus as in claim 12, in which said recording means includes acknowledge means for generating an acknowledge signal after recording said recordable signal and a bistable device movable to a first state in response to said record signal and a second state in response to said acknowledge signal, and third error-detecting means responsive to the first state of said bistable device and said second sensing means end signal for producing said error signal.

14. Error-detecting apparatus as in claim 12, in which said sensing means comprises fourth error-detecting means responsive to the coincidence of said record signal and said second sensing means start signal for producing said error signal.

15. Error-detecting apparatus as in claim 11, and delay means responsive to said first sensing means end signal for producing a delay signal of preselected duration, said sensing means comprising fifth error-detecting means responsive to the coincidence of said first sensing means start signal and said delay signal for producing an error signal.

16. Error-detecting apparatus as in claim 11, and clear means connected to said recorder and said sensing means for generating a clear signal when operated to cause said recording means to record signals designating a prior error, said sensing means including a bistable device movable to a first state in response to the sensing of said discrepancy to produce said error signal and to a second state in response to said clear signal to remove said error signal.

17. Error-sensing means as in claim 10, in which said business machine includes a function cycle mechanism, and deenergizing means responsive to the movement of each of said plurality of information keys to said first commitment level for deenergizing said function cycle mechanism.

18. Error-sensing means as in claim 17, in which said deenergizing means includes means responsive to said error signal for deenergizing said function cycle mechanism.

19. Disabling apparatus for a business machine of the type having selectively and individually operable character keys for entering information into the machine and function keys for operating said machine to perform preselected functions on the entered information, a function cycle mechanism responsive to any one of said function keys for actuating said machine to perform said functions, said character keys being operable to be moved from a rest position to a first commitment level to enter information into said machine, and deenergizing means responsive to the movement of any one of said character keys toward said first commitment level for deenergizing said function cycle mechanism.

* * * * *